United States Patent

[11] 3,591,304

| [72] | Inventors | Maso Galbarini<br>Pavia;<br>Francesco Cotta Ramusino, Milan, both of, Italy |
|---|---|---|
| [21] | Appl. No. | 857,092 |
| [22] | Filed | Sept. 11, 1969 |
| [45] | Patented | July 6, 1971 |
| [73] | Assignee | Innocenti Societa Generale per L'Industria Metallurgica E Meccanica<br>Milan, Italy |
| [32] | Priority | Sept. 21, 1968 |
| [33] | | Italy |
| [31] | | 53,220/68 |

[54] DEVICE FOR STIFFENING AND DEADENING VIBRATIONS OF MACHINE-TOOL PARTS
10 Claims, 9 Drawing Figs.

[52] U.S. Cl. .................................................. 408/143
[51] Int. Cl. ............................................. B23b 29/03
[50] Field of Search .......................................... 77/58 R, 58
C. 58 B. 2 R. 3 R. 4 R; 90/12.5; 77/1 R

[56]  References Cited
UNITED STATES PATENTS

| 2,320,333 | 5/1943 | Pierle | 77/58 R |
| 2,412,937 | 12/1946 | Allen | 77/2 R |
| 3,496,806 | 2/1970 | Porath | 77/3 R |

Primary Examiner—Gerald A. Dost
Attorney—Sughrue, Rothwell, Mion, Zinn & Macpeak ABSTRACT: A tool-carrying part of a machine tool is supported to prevent lateral displacement and vibration of the part in operation by a number of support elements which are displaceable radially in unison under the action of fluid pressure to engage a supporting surface of, for example, a workpiece bore. The support elements do not exert a resultant lateral force on the machine tool part, and moreover any lateral displacement or vibration of said part at a speed in excess of a predetermined speed is effectively damped by the reaction of the support elements.

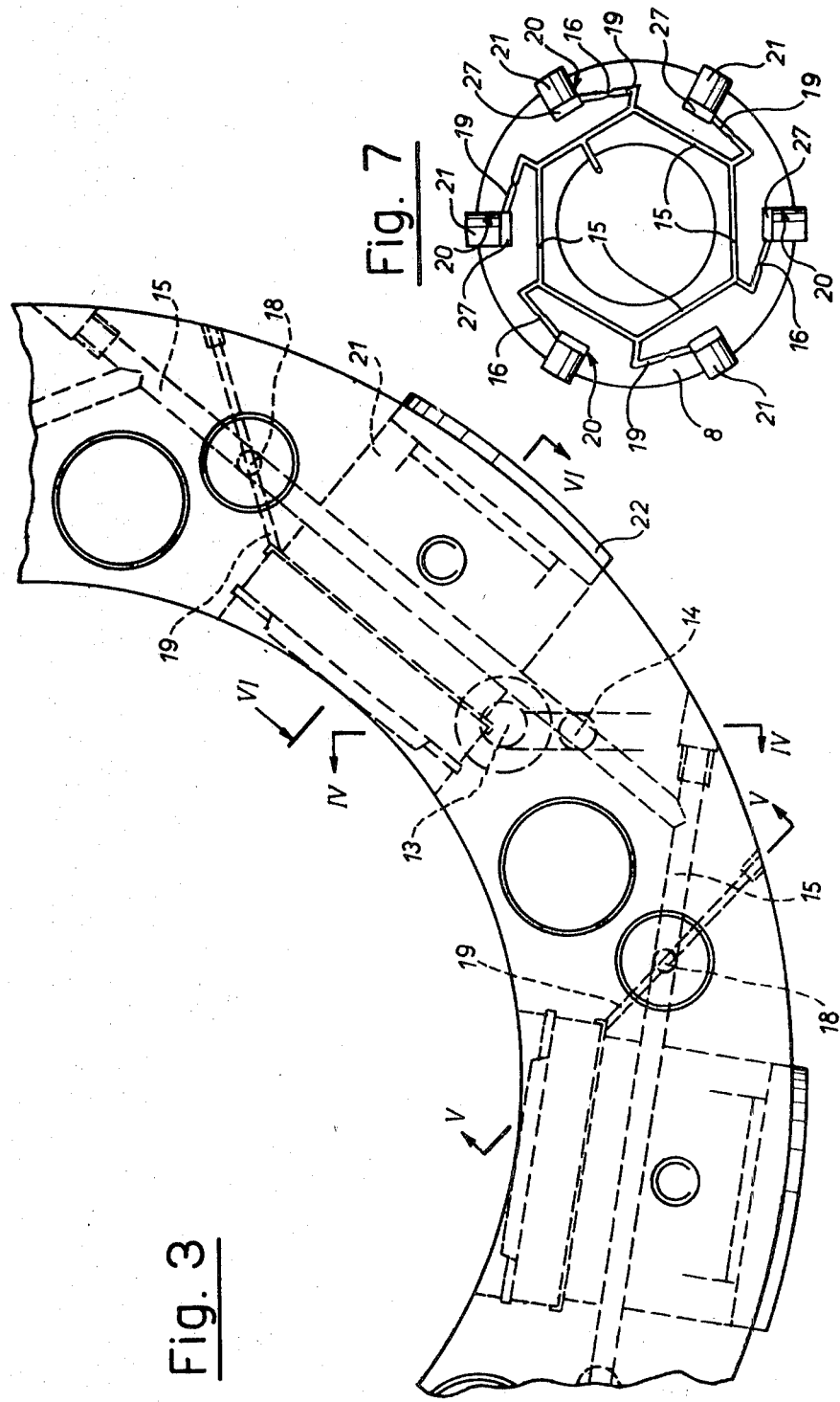

DEVICE FOR STIFFENING AND DEADENING VIBRATIONS OF MACHINE-TOOL PARTS

This invention relates to a device for stiffening and deadening vibrations of machine-tool parts, particularly parts which support rotating tools.

As is known, parts of machine-tools which support rotating tools are subject, in operation, to vibrations which reduce the utilizable power and prejudice the degree of finish of the work.

Such vibrations are particularly noticeable when machining holes in workpieces with which it is not convenient or possible to use the "bareno" system, according to which the tool is held by a rotating bar, supported at the opposite ends of the hole being machined. In such cases, a rotary tool-carrying head is supported in the hole by a nonrotating cantilever support. Generally this support is mounted for sliding movement in an orientable and translatable head so that the support can reach into different holes. When, however, the diameter of the hole is small in relation to its length, it is not generally possible to provide a sufficiently rigid cantilever support. It is therefore necessary in this case, to limit the machining to rough-shaping operations, and it is difficult to obtain high degrees of surface finish.

An object of the present invention is to avoid the above-mentioned drawbacks by providing a device which allows the stiffening of and the deadening of vibrations in machine-tool parts, for example parts which support rotating tools, both in order to allow the application of high power in rough-shaping machining operations, and to obtain a good degree of surface finish in fine machining operations.

A further object of the invention is to provide a device of the above-mentioned type which is able to operate in a way so as not to alter the geometrical configuration of the part of the machine tool to which it is applied.

A further object of the invention is to provide a device of the above-mentioned type, in which the effect of stiffening can be regulated under the control of an operator even to the point of annulling it during working, so that the device can accommodate dimensional variations of a workpiece.

A yet further object of the invention is to provide a device of the above-mentioned type, which can be utilized as a steadying rest, defining a fixed, preselected diameter, for engagement in a bore when it is desired to provide support for a machine-tool part.

The device according to the invention for stiffening and deadening vibrations of a part of a machine tool comprises in its broad aspect: a support; means securing the support to the machine tool part to be stiffened; a number of support elements displaceably mounted in the support; respective fluid pressure actuators in said support effective to move the support elements into engagement with the surface of the part to be stiffened, and means controlling the supply of fluid under pressure to said actuators from outside, said support elements exerting balanced forces on the part to be stiffened and reacting against lateral displacement and oscillation of support occuring at a speed higher than a predetermined speed.

Further characteristics of the invention will be apparent in the course of the detailed description which follows, given by way of nonlimiting example, with reference to the accompanying drawings, in which:

FIG. 3 is a plan view from underneath of a part of an annular support of the stiffening device;

FIG. 7 is a schematic plan view of the device showing the fluid pressure connections between various support elements of the device;

Figure 1:
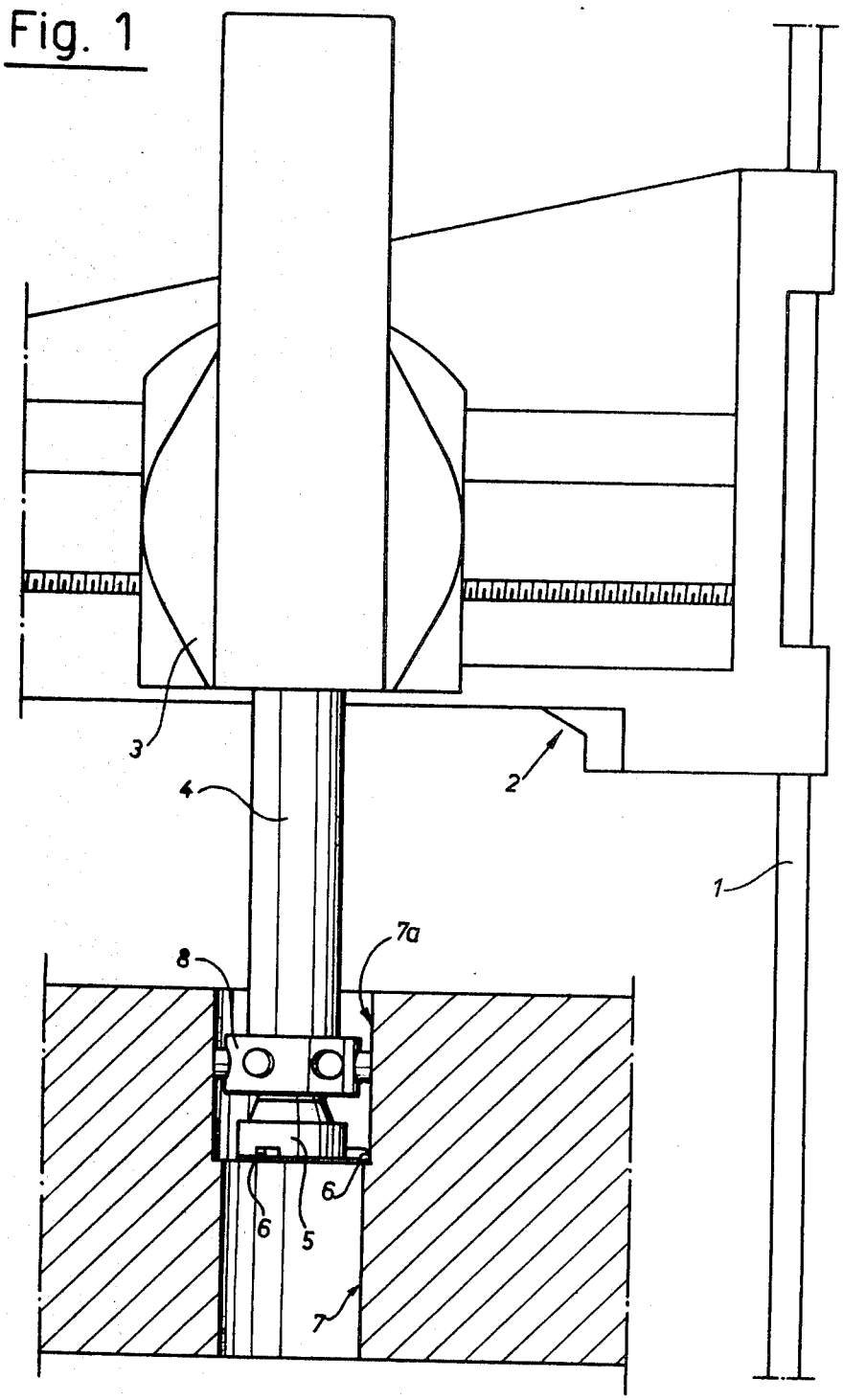
FIG. 1 is a schematic side elevation, showing a part of a machine tool adapted to perform a boring operation and provided with a device according to the invention for stiffening said part.

The illustrated examples refer essentially to the application of a stiffening device according to the invention to a machine tool part for boring holes. FIG. 1 shows diagrammatically at 1 a vertical stanchion of a machine tool from which projects horizontal vertically shiftable arm 2. An angularly adjustable working head 3 is displaceable along the arm 2. The head 3 supports in a sliding manner a vertical nonrotating cantilever support tube 4 inside which is disposed a rotary mandrel (not shown). The mandrel carries at its free end a tool-carrying head 5 from which a number of working tools 6 project radially. The tools 6 are adapted to enlarge a preexistent hole 7 in a workpiece to be machined.

The stiffening device according to the invention comprises an annular support 8, fixed to the free end of the cantilever support tube 4 and provided with a number of lateral support elements which project radially from the support 8 so as to rest directly on the internal machined surface 7a of the hole 7. The support elements comprise respective pistons 21 which are urged radially outwardly by fluid under pressure drawn from the circuit of the machine and fed to respective cylinders 20 in which the pistons 21 are slidably mounted.

Figure 2:
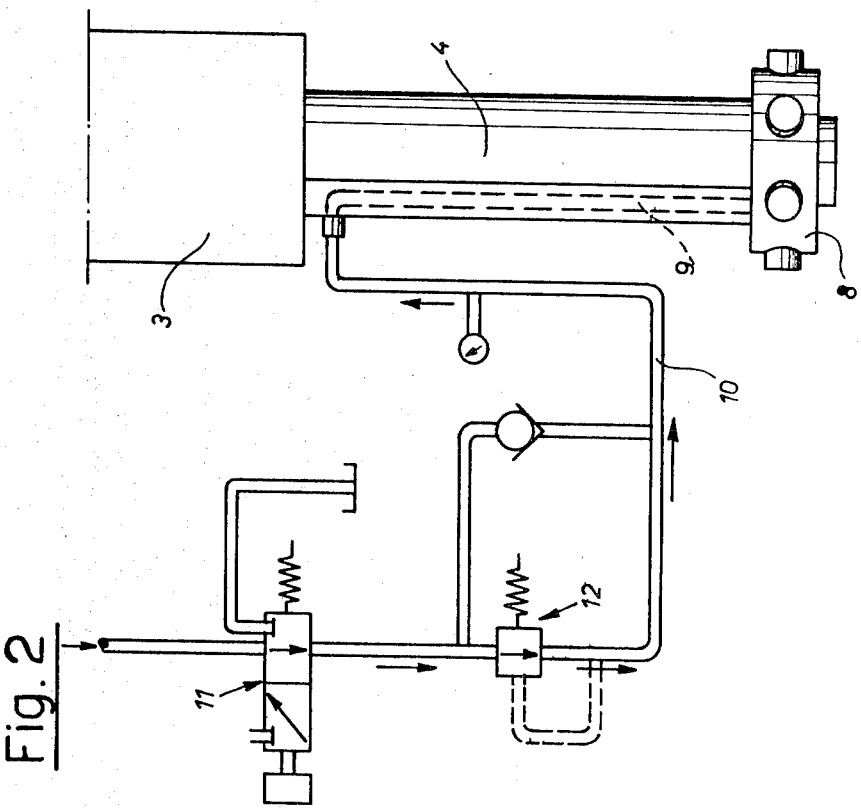
FIG. 2 is a schematic side view of the said part of the machine tool of the device, illustrating diagrammatically the working fluid supply circuit associated therewith.

FIG. 2 shows a supply circuit for the pressure fluid (oil): the support tube 4 carries in its wall thickness a number of tubes, one of which 9, is used to feed oil under pressure to the stiffening device. This oil, which is drawn from the circuit of the machine through a conduit 10, is supplied through a directional electrovalve 11 and a pressure regulating valve 12 in series. The conduit 10 communicates with the tube 9 at the upper end of the support tube 4, remote from the support 8 of the device.

Figure 5:
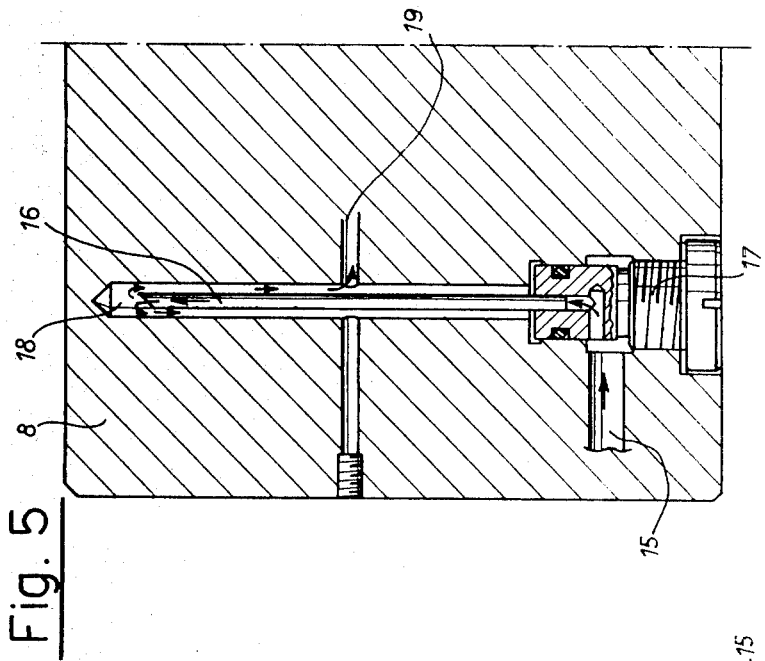
Figure 4:
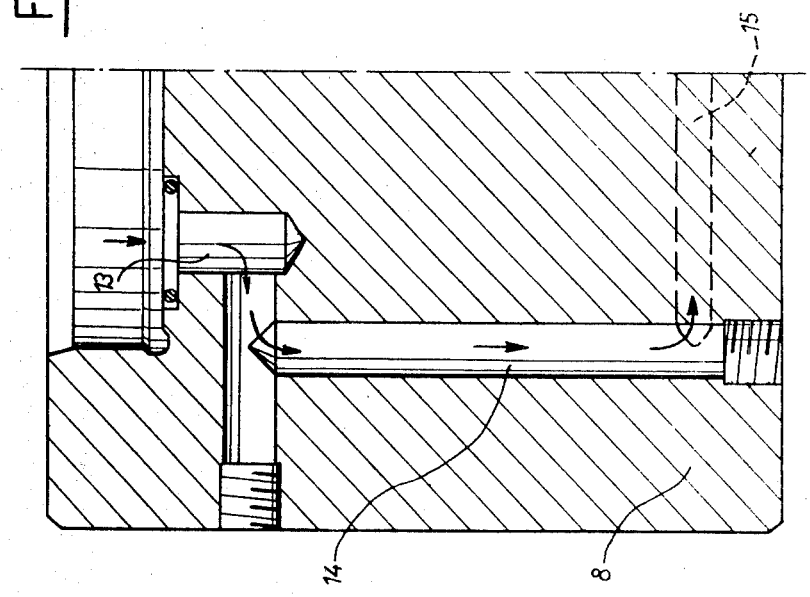

As shown in FIGS. 3, 4, and 5 the bore of the support tube 4 is connected through a vertical drilling 13 in the support 8 and an eccentrically offset vertical drilling 14 in the support 8 to one of a number of horizontal interconnected passages 15 which, as shown in FIGS. 3 and 7, form a circumferentially continuous internal passage in the annular body of the support 8.

Respective vertically extending channels 18 communicate with each passage 15. Each channel 18 houses a fine tube 16 which acts as a restrictor and which communicates with a transverse (horizontally extending) bore 19 leading to one of the respective radial cylinders 20 formed in the thickness of the annular support 8. The restrictor tubes 16 are fixed to screw threaded plugs 17 inserted into the support 8 to permit of easy changing of the tubes 16 when it is desired to substitute tubes 16 of a different diameter. Fluid under pressure (oil), is distributed through the passages 15 and reaches the cylinders 20 after passing through the restrictions formed by the tubes 16, as shown diagrammatically in FIG. 7. The restrictions formed by the tubes 16 can if desired be closed completely by replacement or adjustment of the plugs 17.

Figure 6:
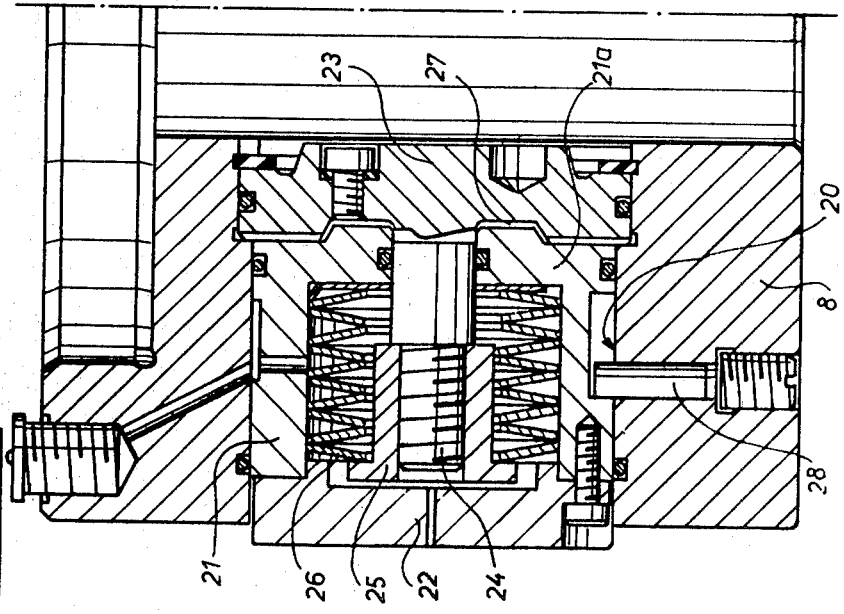
FIGS. 4, 5 and 6 are transverse cross sections of said part, taken on lines IV-IV, V-V, and VI-VI respectively of FIG. 3.

Each of the cylinders 20, as shown in FIG. 6, is closed at its radially inner end by a fixed cover 23. The respective piston 21 slidably mounted in the cylinder 20 is provided with a head 22 projecting radially outwardly from the outer surface of the support 8. The piston 21 is biassed radially inwardly by resilient biassing means comprising a number of stacked cup-shaped washers 23 reacting against a radially inner end wall 21a of the piston 21 and resting at its radially outer end against a supporting ferrule 25, screwed on to a threaded stem 24, which is disposed coaxially within the cylinder 20 and is solid with the fixed cover 23.

A rear chamber 27 is formed between the fixed cover 23 and the radially inner end wall 21a of each piston 21. A respective one of the bores 19 opens into the chamber 27 for the induction of the fluid under pressure thereto. The action of the cup-shaped spring washers 23 urges the respective pistons 21 radially inwardly towards retracted positions in the support 8, while the pressure of the fluid (oil) supplied to the chambers 27 causes the pistons 21 to project radially from the support 8 to rest on the internal worked surface 7a of the hole 7 in the workpiece.

The head 22 of each piston 21 which rests on the internal surface 7a of the completed hole 7 is adapted to the particular purpose of the tools 6, such as rough shaping or finishing: thus the heads 22 can be made of bronze or white metal when they are intended to contact a finished surface 7a so as not to damage the surface; alternatively, the heads 22 may be made of a hard metal when they are intended to contact a rough-shaped surface so as not to wear out during rough shaping. Also envisaged is the provision of a rolling element at the radially outer end of each piston 21 to roll on the worked surface 7a of the bored hole 7 without damaging it.

Each piston 21 cooperates with a damping element 28 which projects from the wall of the cylinder 20 into a slot in the external surface of the piston 21, the slot being elongated in a direction parallel to the piston axis.

When the pistons 21 rest on the surface 7a of the bored hole 7, they press against the surface 7a with a radial force which for each piston 21 is given by the difference between the product of the oil pressure and the effective surface area of the piston 21 and the reaction force of the cup-shaped spring washers 26.

The cylinders 20 and pistons 21 are spaced apart at equal angular intervals and the forces with which they press against the surface 7a of the hole 7 are identical for all the pistons. Consequently there is a null resultant force on the support 8, and there is no lateral loading of the tool-carrying head 5 or of its support tube 4.

The variation of the biassing force of the spring washers 26 is negligible, and the absence of lateral loading on the head 5 results in the latter being completely free and able to follow its natural trajectory on movement of the support tube 4 without being forced by the stiffening device. The stiffening device comes into action when the head 5 has a tendency to shift laterally, due to example to vibrations caused by the well-known phenomena of instability of cut of the tools, or by oscillations due to unbalanced resultants of the cutting forces arising from the tools 6.

Upon lateral movement of the head 5, oil flows from a cylinder 20 in which the respective piston 21 is moving centripetally and flows into a cylinder 20 in which the piston 21 is moving centrifugally, this oil flow taking place through the respective restrictor tubes 16. When the lateral speed of the head 5 exceeds a predetermined value the oil flow through the restrictor tubes 16 causes a significant difference in the oil pressures in the respective chambers 27, the size of this pressure difference being directly dependent upon the speed of the lateral movement of the head 5: the increase in the pressure in the or each cylinder 20 in which the piston 21 is moving centripetally precisely matches the decrease in pressure in the or each cylinder 20 in which the piston 21 is moving centrifugally. The action of the pistons 21 is therefore such as to resist rapid lateral movements of the head 5, effectively eliminating damaging vibration and oscillation thereof. According to the variation illustrated in FIGS. 8 and 9, each piston 21' is crossed diametrically by a pin 29 having conically shaped ends tapering at an angle of 45°. These ends are located in a pair of conjugate conical seats 30a, 31a carried by respective bearing blocks 30, 31 placed in the body of the support 8. One of such seats 30a is provided in a fixed block 30 while the opposite seat 31a of each pair is provided in an annular element 31, common to all the seats 31a, surrounding the support 8 and displaceable axially thereof by means of a nut 32, which cooperates with a fixed externally screw-threaded collar 33 on the support 8. The nut 32 can be locked in any desired position of adjustment by means of a radial locking grub screw 34.

Figure 8:
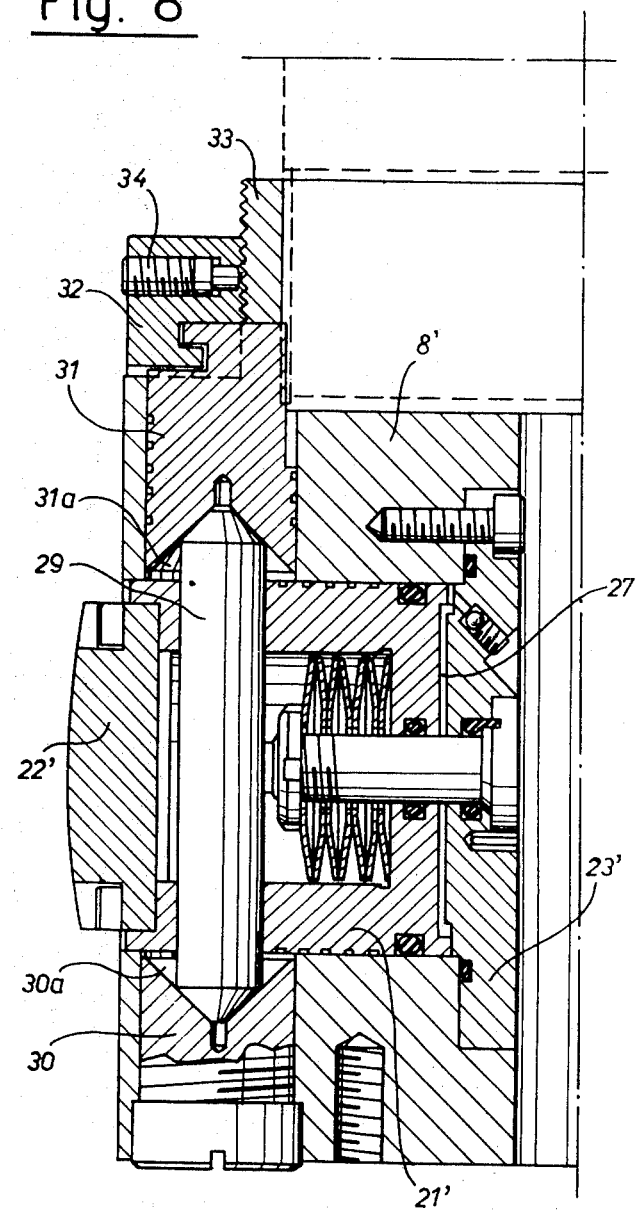
FIG. 8 is an axial section of one support element of a device, according to a variation of FIG. 6, illustrated in one working position.
Figure 9:
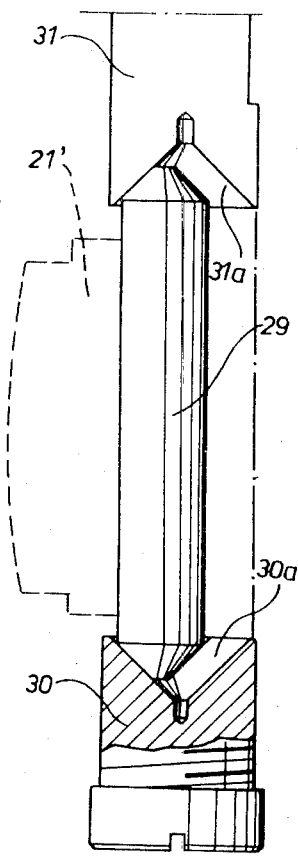
FIG. 9 is a partial view similar to FIG. 8, showing parts of said support element in another working position.

Each pin 29 acts as a radial stop to the centrifugal motion of the respective piston 21' under the action of the pressure fluid (oil). Adjustment of these stops can be effected simultaneously by adjusting the annular element 31 axially on the support 8: each pin 29 assumes a stop position in which its conical ends contact the conical seats 30a, 31a along respective generators of the seats 30a, 31a disposed in the planes containing the axes of the pins 29, closest to the outer surface of the support 8' as illustrated in FIG. 9. In FIG. 8 the conical seats 30a, 31a are shown in their positions of closest approach, in which no displacement of the pin 29 radially, that is, parallel to the axis of the piston 21', is permitted.

The arrangement of FIGS. 8 and 9 permits simultaneous adjustment of the radially outermost positions of all the pistons 21', so that when the latter are fully extended under the influence of the fluid pressure their heads 22' define a circle of a predetermined diameter. This embodiment can be used with a steady support 8' to impose a desired position on the head 5.

It will be appreciated that details of construction of embodiments of the invention can be widely varied from those described and illustrated without departing from the invention. Thus, for example, the expansible supports could be adapted to react on the external surfaces of a workpiece or on surfaces which are not circular or not directly worked by a tool.

What we claim is:

1. Device for stiffening and deadening vibrations of a part of a machine tool, comprising: a support; means securing the support to the machine tool part to be stiffened; a number of support elements displaceably mounted in the support; respective fluid pressure actuators in said support effective to move the support elements into engagement with the surface of the part to be stiffened, and means controlling the supply of fluid under pressure to said actuators from outside, said support elements exerting balanced forces on the part to be stiffened and reacting against lateral displacement and oscillation of support occuring at a speed higher than a predetermined speed.

2. Device according to claim 1, wherein the support is annular and the support elements are mounted therein for movement radially with respect to the axis of the support.

3. Device according to claim 1, including means interconnecting the fluid pressure actuators to equalize the forces exerted thereby under static conditions.

4. Device according to claim 3, wherein the means interconnecting the fluid pressure actuators include at least one restrictor element 5. Device according to claim 4, wherein each restrictor element comprises a replaceable tube located in a channel closed at an end adjacent an open end of the tube.

6. Device according to claim 1, including return spring means acting on each actuator in opposition to the action of the fluid pressure thereon.

7. Device according to claim 1, including means regulating the supply of fluid under pressure to the actuators.

8. Device according to claim 1, including stop means cooperating with the support elements to stop them in adjustable radial positions upon centrifugal movement of said support elements.

9. Device according to claim 8, including a common adjusting member effective to adjust the stop means simultaneously.

10. Device according to claim 9, wherein the stop means comprise respective pins extending transversely in the respective support elements, and including respective cooperating pairs of conical seats receiving opposite ends of said pins, and a common element carrying one of each of said pairs of conical seats, said element being movable to adjust the distance between the seats of each pair, and the common adjusting member comprising a nut coupled to the support and effecting adjusting movement of said element.